US012506671B2

(12) United States Patent
Sibel et al.

(10) Patent No.: US 12,506,671 B2
(45) Date of Patent: Dec. 23, 2025

(54) METHOD AND DEVICE FOR ALLOCATING RADIO RESOURCE

(71) Applicant: MITSUBISHI ELECTRIC CORPORATION, Tokyo (JP)

(72) Inventors: Jean-Christophe Sibel, Rennes (FR); Nicolas Gresset, Rennes (FR)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 293 days.

(21) Appl. No.: 18/286,001

(22) PCT Filed: Oct. 19, 2021

(86) PCT No.: PCT/JP2021/039190
§ 371 (c)(1),
(2) Date: Oct. 6, 2023

(87) PCT Pub. No.: WO2022/230218
PCT Pub. Date: Nov. 3, 2022

(65) Prior Publication Data
US 2024/0195715 A1  Jun. 13, 2024

(30) Foreign Application Priority Data

Apr. 29, 2021 (EP) ..................................... 21305555

(51) Int. Cl.
*H04L 43/0823* (2022.01)
*H04W 72/0446* (2023.01)
*H04W 72/54* (2023.01)

(52) U.S. Cl.
CPC ..... *H04L 43/0823* (2013.01); *H04W 72/0446* (2013.01); *H04W 72/54* (2023.01)

(58) Field of Classification Search
CPC ..... H04L 43/0823; H04L 67/62; H04L 67/61; H04L 67/125; H04L 47/781;
(Continued)

(56) References Cited

U.S. PATENT DOCUMENTS

2010/0023623 A1* 1/2010 Saffre ................... H04L 47/781
709/212
2012/0017216 A1* 1/2012 Chan ....................... H04W 4/70
718/102
(Continued)

OTHER PUBLICATIONS

International Search Report (PCT/ISA/210) issued in PCT/JP2021/039190, dated Feb. 18, 2022.
(Continued)

*Primary Examiner* — Vinncelas Louis
(74) *Attorney, Agent, or Firm* — Birch, Stewart, Kolasch & Birch, LLP

(57) ABSTRACT

A method for allocating a radio resource in a system comprising a resource scheduler and a set of devices is disclosed. Each device hosts at least one application, each application transmitting messages to at least one receiver on a transmission channel. The resource scheduler first receives, from each application, application parameters representative of application's requirements. Then, it computes, for each application, a metric responsive to at least part of the received application parameters, to an average probability of failure of said application and further to a channel error probability of said transmission channel. The metrics are compared and, responsive to said comparison, it selects the application to allocate the radio resource to. The average probability of failure each application is further updated. Finally, it transmits an instantaneous probability of failure to each application, said instantaneous probability of failure being used by said application to update its application parameters.

16 Claims, 8 Drawing Sheets

(58) Field of Classification Search
CPC ............. H04W 72/0446; H04W 72/54; H04W 72/542; H04W 72/20; H04W 4/38; H04W 72/1263; H04W 72/12; H04W 72/535; H04W 4/70
See application file for complete search history.

(56) References Cited

U.S. PATENT DOCUMENTS

| | | | |
|---|---|---|---|
| 2014/0098778 A1* | 4/2014 | Valentin | H04W 72/12 370/329 |
| 2015/0319772 A1* | 11/2015 | Halabian | H04W 72/535 370/329 |
| 2021/0092753 A1 | 3/2021 | Choi et al. | |

OTHER PUBLICATIONS

Sousa et al., "A Survey on QoE-oriented Wireless Resources Scheduling", arxiv.org, Cornell University Library, May 22, 2017, pp. 1-28.
Written Opinion of the International Searching Authority (PCT/ISA/237) issued in PCT/JP2021/039190, dated Feb. 18, 2022.

* cited by examiner

METHOD AND DEVICE FOR ALLOCATING RADIO RESOURCE

TECHNICAL FIELD

At least one of the present embodiments generally relates to a method for allocating, by a resource scheduler, a radio resource in a system comprising a set of devices, each devices hosting at least one application.

BACKGROUND ART

The Fourth Industrial Revolution (or Industry 4.0) refers to the automation of traditional manufacturing using smart technology such as Internet of Things, cloud computing.

Robotics is part of the Industry 4.0. Indeed, in smart factories, robots are used to limit human operations. In this framework, communications play a key role. The application's requirements in Industry 4.0 is centered on multiple factors such as reliability, latency, longevity of communication devices. Currently, robots are often connected to a wired infrastructure. Time Sensitive Networking (TSN) is the standard Ethernet-based technology for converged networks of Industry 4.0 due to its capacity to support deterministic latency requirements. More precisely, TSN standard extend the traditional Ethernet data-link layer standards to guarantee data transmission with bounded ultra-low latency, low delay variation (jitter), and extremely low loss, which is ideal for industrial control and automotive applications.

TSN defines Time Aware Shaper (TAS) schedulers for guaranteeing the transmission of high priority deterministic traffic in a bounded time. However, TAS suffers from high overhead for short lived flows and thus degrades communication performance.

In addition, contrary to wireless technologies, TSN based networks cannot provide the required flexibility to support mobile industrial applications required for the factories of the future. Wireless networks have many advantages, including flexibility, low cost, ease of deployment but at the cost of reliability.

It is thus desirable to find a method for resource allocation in a wireless environment that satisfies application's requirements while ensuring good communication performance.

SUMMARY OF INVENTION

At least one of the present embodiments generally relates to a method for allocating a radio resource in a system comprising a resource scheduler and a set of devices, each device hosting at least one application, each application transmitting messages to at least one receiver on a transmission channel. The method comprises, executed by the resource scheduler, at least one iteration n of:

a) receiving, from each application, application parameters representative of application's requirements;
b) computing, for each application, a metric responsive to at least part of the received application parameters, to an average probability of failure of said application and further to a channel error probability of said transmission channel;
c) comparing the metrics and, responsive to said comparison, selecting the application to allocate the radio resource to;
d) updating, for said each application, the average probability of failure; and
e) transmitting an instantaneous probability of failure to each application, said instantaneous probability of failure being used by said application to update at least one of its application parameters.

This method satisfies application's requirements while ensuring good communication performance. Thus, the resource allocation method makes it possible to reduce the number of application failures while still ensuring good communication performance namely thanks to the feedbacks from the resource scheduler to the applications.

In a specific embodiment, a) to e) are repeated iteratively.

In a specific embodiment, said application parameters representative of application's requirements comprise a resilience value, a message lifetime and a message period.

In a specific embodiment, computing, for each application, a metric responsive to at least part of the received application parameters, to an average probability of failure of said application and further to a channel error probability of said transmission channel comprises:

computing, for each application of index k, an instantaneous probability of failure $f_k^{(n)}$ responsive to said at least part of the received application parameters and to said channel error probability $P_{e_k}^{(n)}$ of said transmission channel; and computing said metric $M_k^{(n)}$ as follows:

$$M_k^{(n)} = \frac{\left(1 - P_{e_k}^{(n)}\right) f_k^{(n)}}{\left(N_k^{(n-1)} + 1\right) F_k^{(n-1)\alpha}}$$

where $N_k^{(n-1)}$ is a number of messages buffered by said application of index k since the application started;
$F_k^{(n-1)}$ is the average probability of failure of said application of index k at iteration (n−1); and
α is a predetermined parameter.

In a specific embodiment $$f_k^{(n)} = P_{e_k}^{(n)\rho_k^{(n)} H\left(Q_k^{(n)}\right)},$$

where $Q_k^{(n)}$ is a number of transmission opportunities before a resilience violation of the application of index k or a number of time slots before a resilience violation of the application of index k, H( ) is a predefined increasing affine function or an identity function and $\rho_k^{(n)}$ is an average resource usage In a specific embodiment, updating the average probability of failure $F_k^{(n)}$ comprises:
computing $$F_{k^*}^{(n)} = \frac{N_{k^*}^{(n-1)} F_{k^*}^{(n-1)}}{N_{k^*}^{(n-1)} + 1} \text{ and } N_{k^*}^{(n)} = N_{k^*}^{(n-1)} + 1,$$

in the case where k* is the index of the selected application and a packet corresponding to a message sent by the selected application using the allocated radio resource is received;

otherwise if there is still a transmission opportunity, computing $F_k^{(n)} = F_k^{(n-1)}$ and $N_k^{(n)} k = N_k^{(n-1)}$ and if there is no more transmission opportunity, computing $$F_k^{(n)} = \frac{N_k^{(n-1)} F_k^{(n-1)}}{N_k^{(n-1)} + 1} \text{ and } N_k^{(n)} = N_k^{(n-1)} + 1.$$

A method for allocating a radio resource in such a system is also disclosed. The method comprises the following steps executed by each device hosting at least one application:

receiving, for said at least one application, an instantaneous probability of failure of said application from said resource scheduler;

updating at least one application parameter representative of application's requirements responsive to said received instantaneous probability of failure and further to a previous value of said application parameter;

transmitting the updated application parameter to said resource scheduler, said updated application parameters being used by said resource scheduler to allocate a new radio resource.

In a specific embodiment, said at least one application parameter being a resilience, updating at least one application parameter comprises comparing the received instantaneous probability of failure with a threshold value and increasing said resilience in the case where the received instantaneous probability of failure is above said threshold value.

In a specific embodiment, updating at least one application parameter comprises updating a resilience and an angular velocity by comparing the received instantaneous probability of failure with a threshold value and decreasing said angular velocity and further increasing said resilience in the case where the received instantaneous probability of failure is above said threshold value.

In a specific embodiment, the method further comprises:

receiving, for said at least one application, an average resource usage of said application from said resource scheduler;

and wherein said at least one application parameter is updated responsive to said received instantaneous probability of failure, to a previous value of said application parameter and further to said average resource usage.

A resource scheduler configured for allocating a radio resource in such a system is further disclosed. The resource scheduler comprises at least one processor configured to:

a) receive, from each application, application parameters representative of application's requirements;

b) compute, for each application, a metric responsive to at least part of the received application parameters, to an average probability of failure of said application and further to a channel error probability of said transmission channel;

c) compare the metrics and, responsive to said comparison, selecting the application to allocate the radio resource to;

d) update, for each application, the average probability of failure; and e) transmit an instantaneous probability of failure to each application, said instantaneous probability of failure being used by said application to update the application parameters.

A device hosting an application in such a system is disclosed. The device comprises at least one processor configured to:

receive, for said at least one application, an instantaneous probability of failure of said application from said resource scheduler;

update at least one application parameter representative of application's requirements responsive to said received instantaneous probability of failure, and further to a previous value of said application parameter;

transmit the updated application parameter to said resource scheduler, said updated application parameters being used by said resource scheduler to allocate a new radio resource.

A system comprising such a resource scheduler and such a device hosting an application is also disclosed.

A computer program product comprising program code instructions is disclosed that can be loaded in a programmable device, the program code instructions causing implementation of the method according to the various embodiments when the program code instructions are run by the programmable device. A storage medium storing such a computer program is disclosed.

The characteristics of the invention will emerge more clearly from a reading of the following description of at least one example of embodiment, said description being produced with reference to the accompanying drawings.

DESCRIPTION OF EMBODIMENTS

The various embodiments are disclosed in the context of a smart factory where moving robots are installed to fulfill various missions such as for example moving from one location to another location in the factory within a certain amount of time. However, these embodiments may also apply in other environments such as for example environments including autonomous vehicles.

Figure 1:
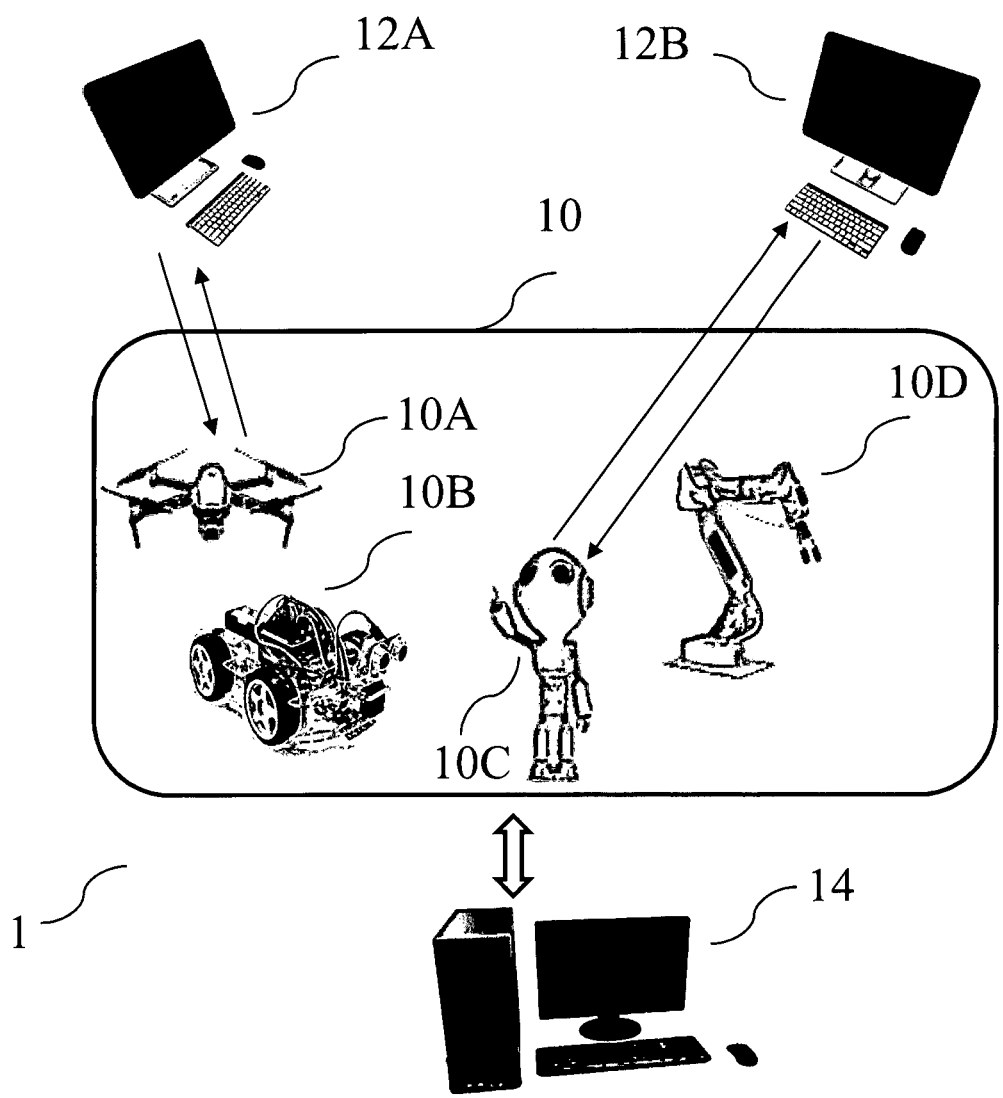
FIG. 1 depicts a system in which the present embodiments may be implemented.

FIG. 1 depicts a system 1, for example as part of a smart factory, in which the present embodiments may be implemented. The system 1 comprises a set 10 of moving robots 10A to 10D, each being capable of moving from one location to another in the factory. The set 10 may also include non-moving robots. The moving robots 10A to 10D are in wireless communication with one or more controlling devices 12A-12B with which they exchange application messages. Each controlling device 12A-12B may be a base station, a MEC (English acronym of "Multi-access Edge Computing") station or a mobile station. The controlling devices 12A-12B are for example configured to plan and monitor the missions of the robots 10A-10D. As an example, on FIG. 1, the controlling device 12A transmits application messages comprising data representative of its mission to the robot 10A while the controlling device 12B transmits application messages comprising data representative of its mission to the robot 10C. The mission data may comprise displacement data (e.g. angular speed, linear speed, pressure level, etc), interaction data, motion data, etc. In return, the robot 10A (10C respectively) transmits application messages to the controlling device 12A (12B respectively). The application messages transmitted from the robots to the controlling devices comprise for example monitoring data or environment data. Depending on the applications, the exchanges of application messages may be periodic or aperiodic.

Each robot 10A-10D and each controlling device 12A-12B comprises at least one application module. Thus, an application message is more particularly exchanged between the application module of a robot and the application module of a controlling device. An application module generally comprises a software entity, namely the application, along with hardware elements such as an application buffer.

A robot usually comprises several physical elements, e.g. a wheel, an arm, etc. Thus, a given robot may need to exchange application messages comprising different types of data with a controlling device depending on the concerned physical element. Therefore, in the following, a stream $S_k$ is defined as the set of application messages $m_k^{(n)}$ transmitted from (respectively received by) a given physical element of a given robot in the set 10 of robots. Said otherwise a plurality of streams may be associated with one and the same robot, e.g. one stream associated with the arm of the robot and one stream associated with each wheel of the robot. In the following, K streams $\{S_1, \ldots, S_K\}$ are considered wherein each stream $S_k$ is associated with a given application $APP_k$. There is thus a one-to-one association between an application $APP_k$ and a stream $S_k$. The application $APP_k$ pushes messages $m_k^{(n)}$ one-by-one into an application buffer of size one message, the messages $m_k^{(n)}$ being transmitted at a time instant n using a radio resource to a corresponding receiver, e.g. to a controlling device.

Figure 2:
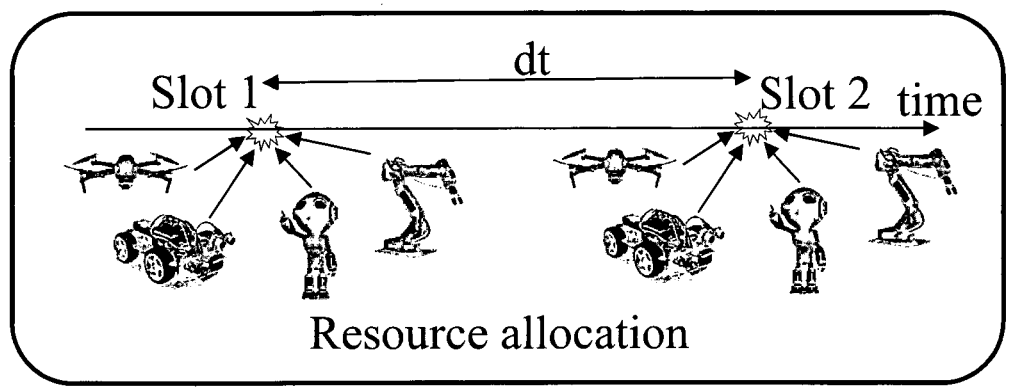
FIG. 2 illustrates the principle of competition between devices to get a resource allocation.

In a wireless environment, the number of radio resources is limited. In the context of radio communication, the number of resources is defined as the number of frequency resources (e.g. subchannels where each subchannel comprises a finite number of frequency blocks) used in a limited amount of time. In order to appropriately allocate these limited radio resources, the system 1 further comprises a resource scheduler (RS) 14 configured to periodically, i.e. every dt (e.g. dt=1 ms), allocate an available radio resource to one specific stream $S_k$. As depicted on FIG. 2, every dt there is thus an opportunity, i.e. a time slot, for an application message $m_k^{(n)}$ to be sent. As illustrated on FIG. 2 the robots and more precisely the streams are in competition to get the resource allocation. The resource scheduler 14 is thus configured to select one stream among K streams to allocate the radio resource to.

The resource scheduler 14 usually comprises a software entity along with hardware elements such as a buffer. The resource scheduler may be located in a base station, a MEC station or a mobile station.

Figure 3:
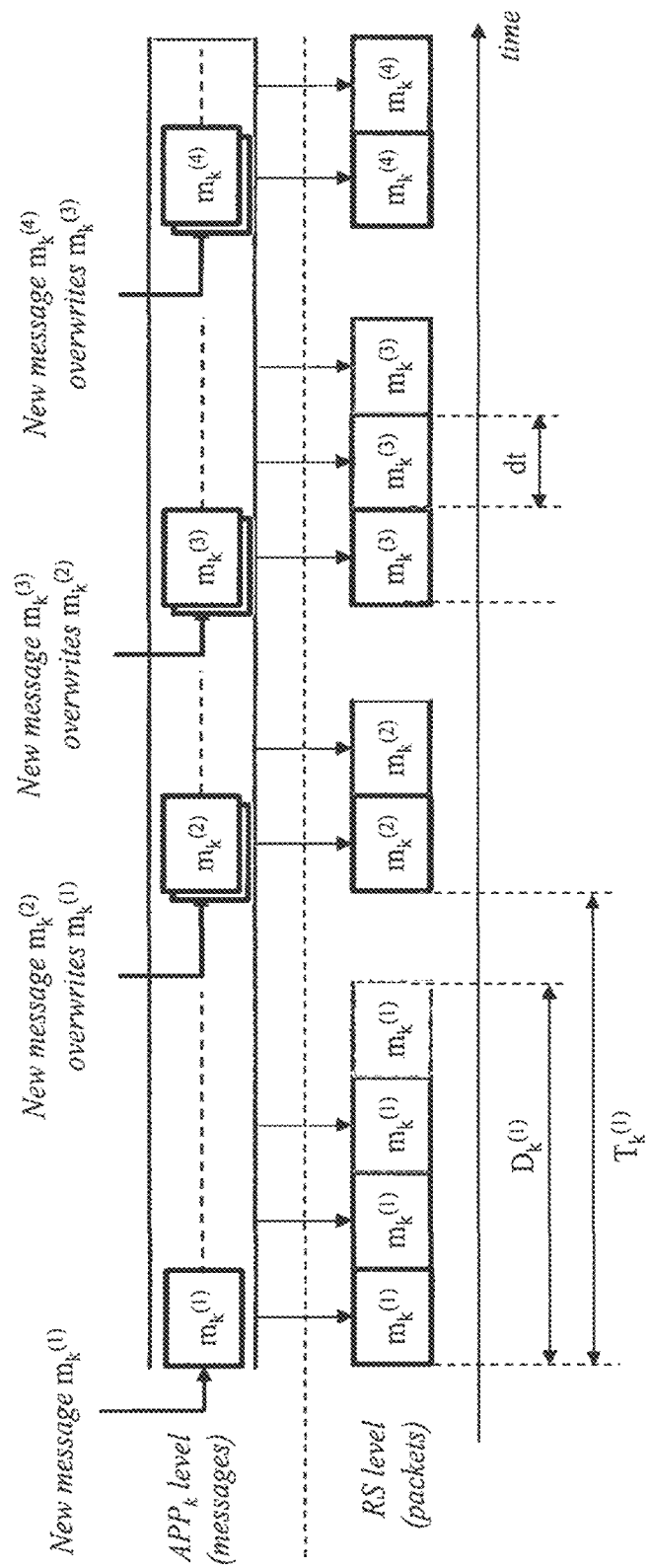
FIG. 3 illustrates various application parameters that relate to a given application.

FIG. 3 illustrates various application parameters that relate to a given application $APP_k$. The application $APP_k$ is for example an application, located in one of the controlling device, configured to control the motion of an arm of a specific robot, e.g. the robot 10C. The application $APP_k$ may be an application located in a specific robot and configured to monitor the environment of the robot. The application $APP_k$ generates several messages $m_k^{(n)}$ at various time instant n with n=1, 2, 3 and 4. These messages are to be sent on a transmission channel $H_k$ between the antenna of a robot, e.g. 10C, associated with the stream $S_k$ and the antenna of a controlling device, e.g. 12B. The transmission channel $H_k$ is characterized by its channel error probability $p_{e_k}^{(n)}$.

Each application $APP_k$ has some requirements defined by a set of application parameters whose values may vary temporally, namely a resilience $R_k^{(n)}$, a message lifetime $D_k^{(n)}$ and a message period $T_k^{(n)}$.

The resilience $R_k^{(n)}$ is the maximum amount of time the application $APP_k$ authorizes for not receiving any message. In case the resilience $R_k^{(n)}$ is violated, i.e. the application $APP_k$ does not receive any message during a time period superior to $R_k^{(n)}$, an application failure occurs. In this case, the associated robot may enter in a safety mode, e.g. a partial or complete stop with a reinitialization.

The message lifetime $D_k^{(n)}$ is the lifetime of a message my when pushed into the application buffer (also called packet delay budget in the literature). Indeed, the message $m_k^{(n)}$ of, for example, any monitoring application is only relevant for a limited time duration in particular because of robot motion. On FIG. 3, the lifetime of the first message my $m_k^{(1)}$ is 4 time slots, the lifetime of the second and fourth messages $m_k^{(2)}$, $m_k^{(4)}$ is 2 time slots and the lifetime of the third message $m_k^{(3)}$ is 3 time slots.

The message period $T_k^{(n)}$ is the time between the life's start of any two consecutive messages. This period may be variable if the application does not need a periodic traffic.

Figure 4:
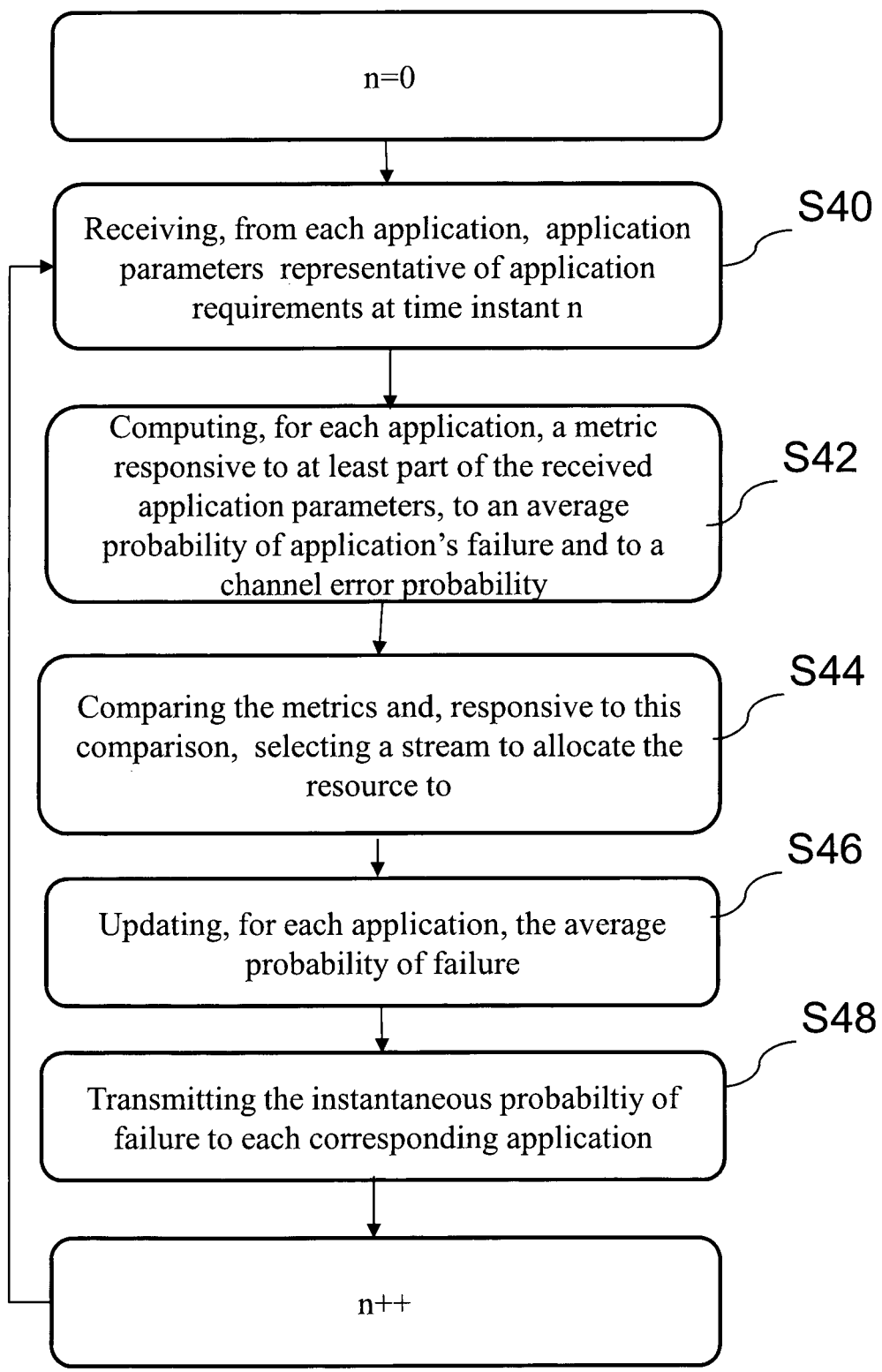
FIG. 4 depicts a flowchart of a method for resource allocation according to a specific embodiment.

FIG. 4 depicts a flowchart of a method for resource allocation according to a specific embodiment. The method is implemented by the resource scheduler 14.

The resource allocation comprises selecting, for an available radio resource, a single stream $S_k$ (thus a single application $APP_k$) according to some metrics $M_k^{(n)}$. The metrics $M_k^{(n)}$ are defined to balance between the satisfaction of the application's requirements of any single stream, e.g. minimizing the number of application failures due to resilience violation, and the sharing of the radio resources between all devices in a most fair manner.

To this aim, the resource scheduler 14 uses for example an α-fair utility-based formalism to ensure a fairness resource allocation between the streams. Accordingly, a local cost function for the $k^{th}$ stream is defined as follows:

$$U_\alpha(F_k^{(n)}),\ U_\alpha(x) = \begin{cases} \dfrac{x^{1-\alpha}}{1-\alpha} & \alpha \neq 1 \\ \log x & \alpha = 1 \end{cases}$$

where $F_k^{(n)}$ is the average probability of failure of the application $APP_k$ at time instant n. The value of a determines the expected fairness of the resource scheduler 14, e.g. α=1 provides a proportional fair, i.e. a balance between throughput of the network while at the same time allowing at least a minimal level of service for all users and α=10 corresponds to a max-min fairness. A global cost function $J^{(n)}$ is then defined as a function of all the local cost functions. For example, $J^{(n)}$ is defined as the sum over k of the local cost functions:

$$J^{(n)} = \sum_{k=1}^{N} U_\alpha(F_k^{(n)}).$$

The cost function $J^{(n)}$ is thus used by the resource scheduler 14 to select, at time instant n, one stream among the K streams to allocate a radio resource to.

The practical implementation of the resource allocation comprises steps S40 to S46.

At step S40, the resource scheduler 14 receives, from each application $APP_k$, the application parameters representative of its application's requirements at time instant n, i.e. $R_k^{(n)}$, $D_k^{(n)}$, $T_k^{(n)}$.

At step S42, the resource scheduler 14 computes, for each stream $S_k$ (thus for each application $APP_k$), a metric $M_k^{(n)}$ responsive to at least part of the received application parameters, i.e. $R_k^{(n)}$, $D_k^{(n)}$, $T_k^{(n)}$, to the average probability of failure $F_k^{(n-1)}$ and further to the channel error probability $P_{e_k}^{(n)}$. $F_k^{(n)}$ is initialized for n=0. For example $F_k^{(0)}=1$ or $F_k^{(0)}$ is set to a random value different from zero. $F_k^{(n)}$ is updated later on, at step S46.

Each metric $M_k^{(n)}$ is computed as follows:

$$M_k^{(n)} = \frac{(1 - P_{e_k}^{(n)})f_k^{(n)}}{(N_k^{(n-1)} + 1)F_k^{(n-1)\alpha}} \quad \text{(Eq. 1)}$$

where: $N_k^{(n-1)}$ is the number of messages buffered by the application $APP_k$ since the application started;

$f_k^{(n)}$ is an instantaneous probability of failure of $APP_k$.

At the time instant n, the probability of failure $F_k^{(n)}$ is not known. It is thus predicted from $F_k^{(n-1)}$ as follows:

$$\hat{F}_k^{(n)} = \frac{N_k^{(n-1)}F_k^{(n-1)} + (1 - \delta_k^{(n)}(1 - P_{e_k}^{(n)}))f_k^{(n)}}{N_k^{(n-1)} + 1} \quad \text{(Eq. 2)}$$

where $\delta_k^{(n)}=1$ in the case the stream k is selected to allocate the radio resource to and $\delta_k^{(n)}=0$ otherwise.

$f_k^{(n)}$ may be computed in different ways depending on the concern for radio conditions and for application's requirements.

In a first embodiment, the metrics $M_k^{(n)}$ take into account the resilience $R_k^{(n)}$ in addition to the radio conditions represented by $P_{e_k}^{(n)}$. In this embodiment, the function $f_k^{(n)}$ may be defined as follows:

$$f_k^{(n)} = P_{e_k}^{(n)} e^{-\frac{n_k + R_k^{(n)} - n}{n - 1 - n_k}}$$

or as follows:

$$f_k^{(n)} = P_{e_k}^{(n)Q_k^{(n)}}$$

where $Q_k^{(n)}$ is set equal to $n_k + R_k^{(n)} - n$, where $n_k$ is the last time instant at which a packet for the application $APP_k$ has been received. The quantity $Q_k^{(n)}$ represents the number of time slots before a resilience violation, i.e. an application failure. Either $Q_k^{(n)}$ is decreased by one if the stream does not succeed in transmitting the packet or $Q_k^{(n)}$ is set to the resilience $R_k$ otherwise. Said otherwise, in the case where the packet is correctly transmitted, i.e. if the resource is allocated and the packet is received, then $Q_k^{(n)}$ is set to the resilience value. In fact, when a transmission succeeded at time instant n, $n_k$ is set equal to the value n and thus consequently $Q_k^{(n)}$ is set equal to $R_k^{(n)}$.

In the case where the packet is not received (because not allocated or allocated but the transmission is unsuccessful), n is increased by 1 and thus $Q_k^{(n)}$ is decreased by one.

In a variant of the first embodiment, $Q_k^{(n)}$ is multiplied by an average resource usage $\rho_k^{(n)}$. As an example, the average resource usage $P_k^{(n)}$ is computed by counting the number of resource allocations obtained by the stream $S_k$ (or in an equivalent manner by the application $APP_k$) until the current time instant n divided by the total number of time slots until the current time instant n. In another example, the average resource usage provides a uniform resource distribution as $\rho_k^{(n)}=1/K$ where K is the number of streams. In another example, $\rho_k^{(n)}$ reflects the resilience with $\rho_k^{(n)}=1/R_k^{(n)}$. The values of average resource usage thus belong to the interval [0; 1]. In this variant, the function $f_k^{(n)}$ is thus defined as follows:

$$f_k^{(n)} = P_{e_k}^{(n)\rho_k^{(n)}Q_k^{(n)}}$$

or more generally as follows:

$$f_k^{(n)} = P_{e_k}^{(n)\rho_k^{(n)}H(Q_k^{(n)})},$$

where H( ) is a predefined function. As an example, H( ) is the identity function or an increasing affine function of $Q_k^{(n)}$, e.g. $H(Q_k^{(n)})=Q_k^{(n)}-1$.

In a second embodiment, the message lifetime $D_k^{(n)}$ and the message period $T_k^{(n)}$ are taken into account in addition to the resilience $R_k^{(n)}$ (through $N_{T_k}^{(n)}$) and the radio conditions $P_{e_k}^{(n)}$. In this embodiment, the function $f_k^{(n)}$ may be defined as follows:

$$f_k^{(n)} = P_{e_k}^{(n)(N_{T_k}^{(n)}-1)D_k^{(n)}} fct(D_k^{(n)}, SNR, ...)$$

where $N_{T_k}^{(n)}$ is the number of remaining messages in the resilience window to be buffered, i.e. $(N_{T_k}^{(n)}-1)$ is the number of remaining messages after the current message, and fct( ) is a predefined function of $D_k^{(n)}$ and/or of SNR and/or additional parameters.

By multiplying $(N_{T_k}^{(n)}-1)$ by the message lifetime $D_k^{(n)}$, the number of remaining transmission opportunities is obtained as of the next message. For example, in the case of HARQ (English acronym of «Hybrid Automatic Repeat reQuest»), the function $f_k^{(n)}$ may be embodied in such a way that it contains the instantaneous probability of failure for the next messages as well as for the current message. For the latter one, the channel error probability is made lower and lower as the time index increases such that $P_{e_k}^{(n)} \leq P_{e_k}^{(n-1)}$ because the redundancy allows for an SNR increase. As an example, $$f_k^{(n)} = P_{e_k}^{(1)(N_{T_k}^{(1)}-1)D_k^{(1)}} P_{e_k}^{(n)D_k^{(n)}-n+1}.$$

Figure 5:
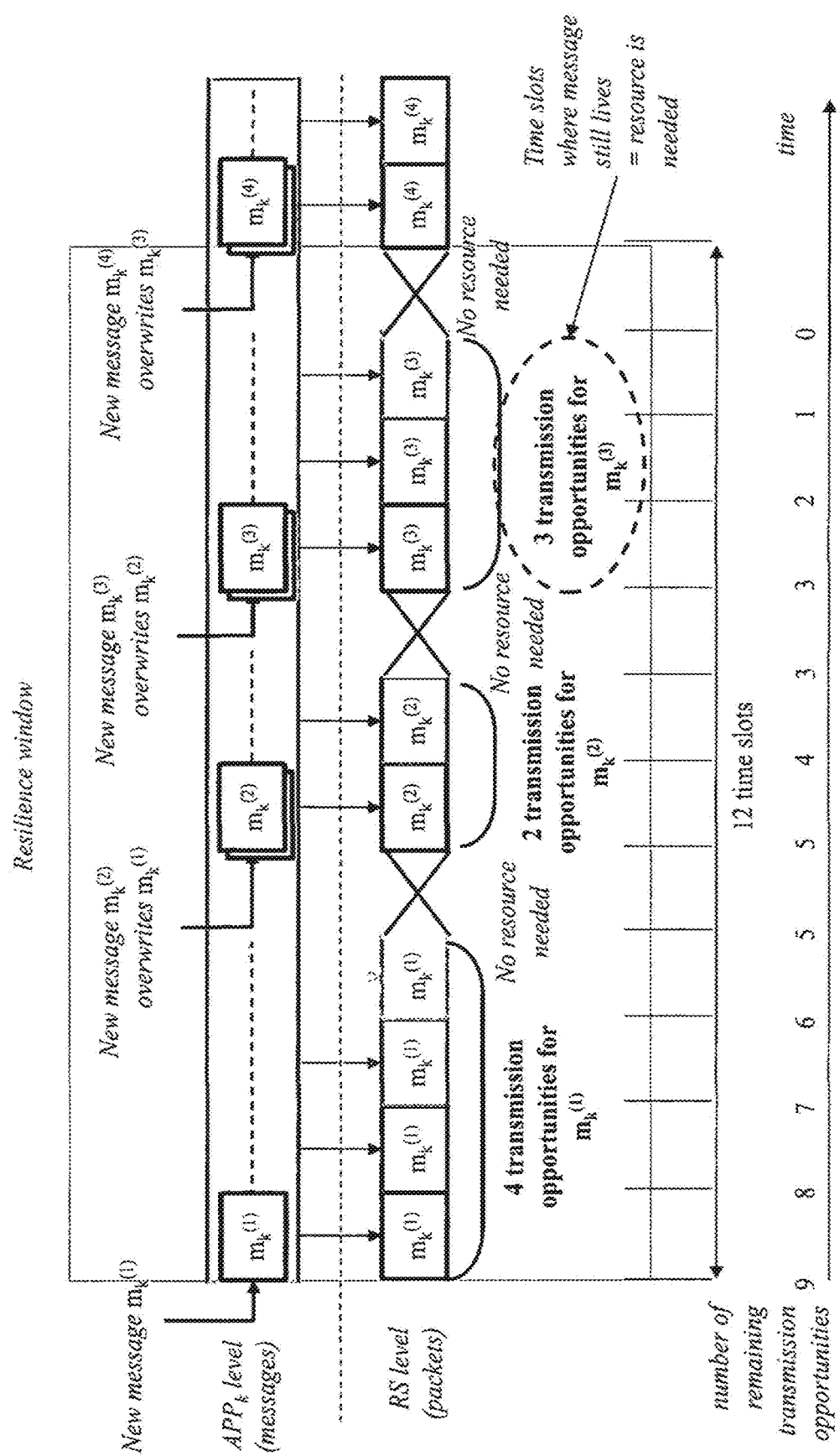
FIG. 5 illustrates the principle of transmission opportunities for each message of a given stream.

In a variant, the function $f_k^{(n)}$ may be defined as follows:

$$f_k^{(n)} = P_{e_k}^{(n)Q_k^{(n)}}$$

where $Q_k^{(n)}$ is set equal to max $\{r_k+D_k^{(n)}-n, 0\}+(N_{T_k}^{(n)}-1)D_k^{(n)}$ with $r_k$ being the first time instant wherein the considered message is considered for the scheduling (i.e. it's the life's start of the considered message)). Here, $Q_k^{(n)}$ represents a number of transmission opportunities before a resilience violation occurs. FIG. 5 illustrates the principle of transmission opportunities for each message of a given stream $S_k$. FIG. 5 is similar to FIG. 3. Therefore, the elements in common are labelled with the same numeral references. On FIG. 5, there are 4 opportunities to transmit the first message, two opportunities for the second message and three opportunities for the third message.

In a variant of the second embodiment, $Q_k^{(n)}$ is multiplied by an average resource usage $\rho_k^{(n)}$ and $f_k^{(n)}$ is thus defined as follows:

$$f_k^{(n)} = P_{e_k}^{(n)\rho_k^{(n)}Q_k^{(n)}}$$

or more generally as follows:

$$f_k^{(n)} = P_{e_k}^{(n)\rho_k^{(n)}H(Q_k^{(n)})},$$

where H( ) is a predefined function. As an example, H( ) is the identity function or an increasing affine function of $Q_k^{(n)}$, e.g. $H(Q_k^{(n)})=Q_k^{(n)}-1$.

In this second embodiment and its variant, $Q_k^{(n)}$ is thus split into a number of remaining transmission opportunities in the next buffered messages to come and an estimated number $d_k^{(n)}$ of remaining transmission opportunities in the current message, i.e. before the current message death. When considering that at low layers (PHY, MAC) there might be Hybrid ARQ mechanisms, the instantaneous current packet probability of failure is not only dependent on $d_k^{(n)}$. Any HARQ-based receiver that accumulates redundancy each time a packet is not well decoded but transmitted (channel failures) observes a reduced current packet probability of failure even considering a constant channel error probability. Indeed, by increasing the redundancy, the probability of well decoding the received packet is increased as if the signal-to-noise ratio (SNR) was greater.

At step S44, the resource scheduler 14 compares the metrics $\{M_1^{(n)}, \ldots, M_K^{(n)}\}$ and, responsive to this comparison, selects a stream k* to allocate the radio resource to. The message $m_{k*}^{(n)}$ of the selected stream is thus sent through the channel $H_{k*}$ to the receiver. At this step, $\delta_{k*}^{(n)}=1$ and $\delta_k^{(n)}=0$ for any $k \neq k*$.

Depending on the definition of the cost $J^{(n)}$:

$$k^* = \arg\max_k \{M_1^{(n)}, \cdots, M_K^{(n)}\}.$$

At step S46, the average probability of failure $F_k^{(n)}$ is updated for each k. The updated value $F_k^{(n)}$ is to be used for the calculation of the metrics $M_k^{(n+1)}$. The probability of failure $F_k^{(n)}$ is updated as follows:

For $APP_{k*}$ in the case where the packet corresponding to the sent message is received $$F_{k*}^{(n)} = \frac{N_{k*}^{(n-1)}F_{k*}^{(n-1)}}{N_{k*}^{(n-1)}+1}$$

and $N_k^{(n)}$ is updated at the same time as follows:

$$N_{k*}^{(n)}=N_{k*}^{(n-1)}+1$$

For $APP_{k*}$ in the case where the packet corresponding to the sent message is not received or for any $APP_{k \neq k*}$:
If there is still a transmission opportunity:

$$F_k^{(n)}=F_k^{(n-1)} \text{ and } N_k^{(n)}=N_k^{(n-1)}$$

Otherwise (i.e. there is no more transmission opportunity):

$$F_k^{(n)} = \frac{N_k^{(n-1)}F_k^{(n-1)}+1}{N_k^{(n-1)}+1} \text{ et } N_k^{(n)} = N_k^{(n-1)} + 1.$$

At step S48, each instantaneous probability of failure $f_k^{(n)}$ computed at S42 is transmitted to the corresponding application $APP_k$. The transmitted instantaneous probability of failure $f_k^{(n)}$ is received by the application $APP_k$ which uses it for updating at least one of its application parameters in order to try to decrease the instantaneous probability of failure at time instant (n+1).

The steps S40 to S48 are repeated iteratively while n is incremented. Thus, n is thus representative of an index of iteration.

Figure 6:
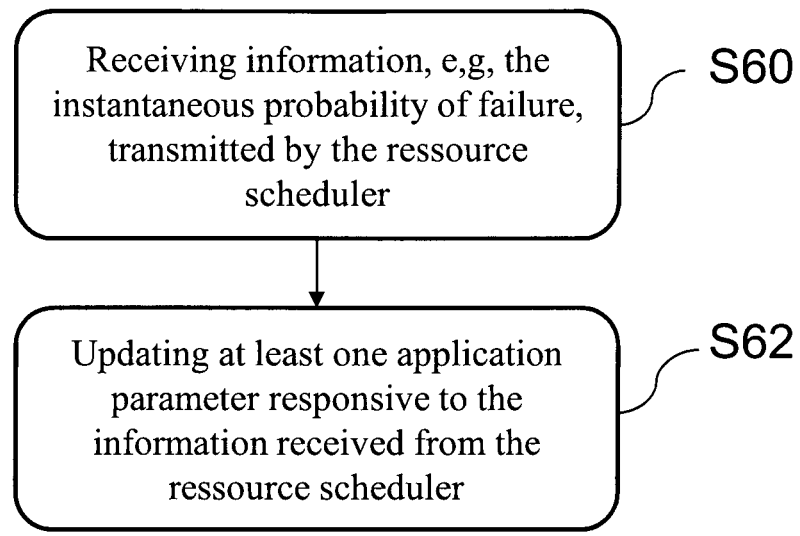
FIG. 6 depicts a flowchart of a method for updating application parameters according to a specific embodiment.

FIG. 6 depicts a flowchart of a method for updating application parameters according to a specific embodiment. The method is implemented in an application module by an application $APP_k$.

In a step S60, the application $APP_k$ receives information, e.g. the instantaneous probability of failure $f_k^{(n)}$ provided by the resource scheduler 14. $f_k^{(n)}$ is only known by the scheduler, i.e. the application is not able to compute it. Consequently, transmitting this information to the application makes it possible for the application to adapt its requirements so as to decrease the probability of failure in the future so that $f_k^{(n+1)} < f_k^{(n)}$.

Figure 7:
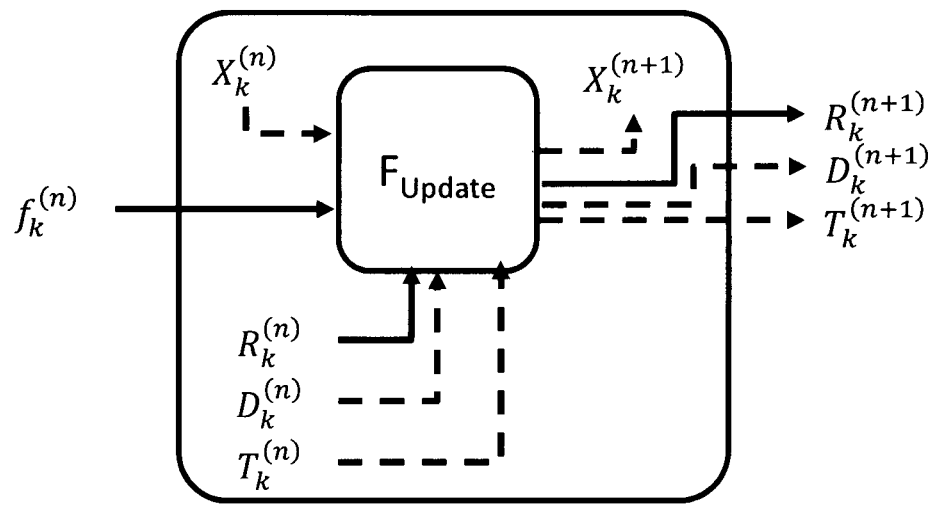
FIG. 7 illustrates the process of updating application parameters according to a specific embodiment.

In a step S62, the application $APP_k$ updates at least one of its application parameters responsive to the received information. As depicted on FIG. 7, the application $APP_k$ uses as inputs $R_k^{(n)}$ and $f_k^{(n)}$ to obtain an updated application parameter $R_k(n+1)$. More generally, the application $APP_k$ uses as inputs $f_k^{(n)}$, $R_k^{(n)}$, and optionally $T_k^{(n)}$, $D_k^{(n)}$, $X_k^{(n)}$, to obtain an updated application parameter $R_k^{(n+1)}$ and optionally updated application parameters $T_k^{(n+1)}$, $D_k^{(n+1)}$, $X_k^{(n+1)}$. $X_k^{(n)}$ is a variable directly related to the application e.g. the velocity of the associated physical element like an arm, a wheel, etc.

Figure 8:
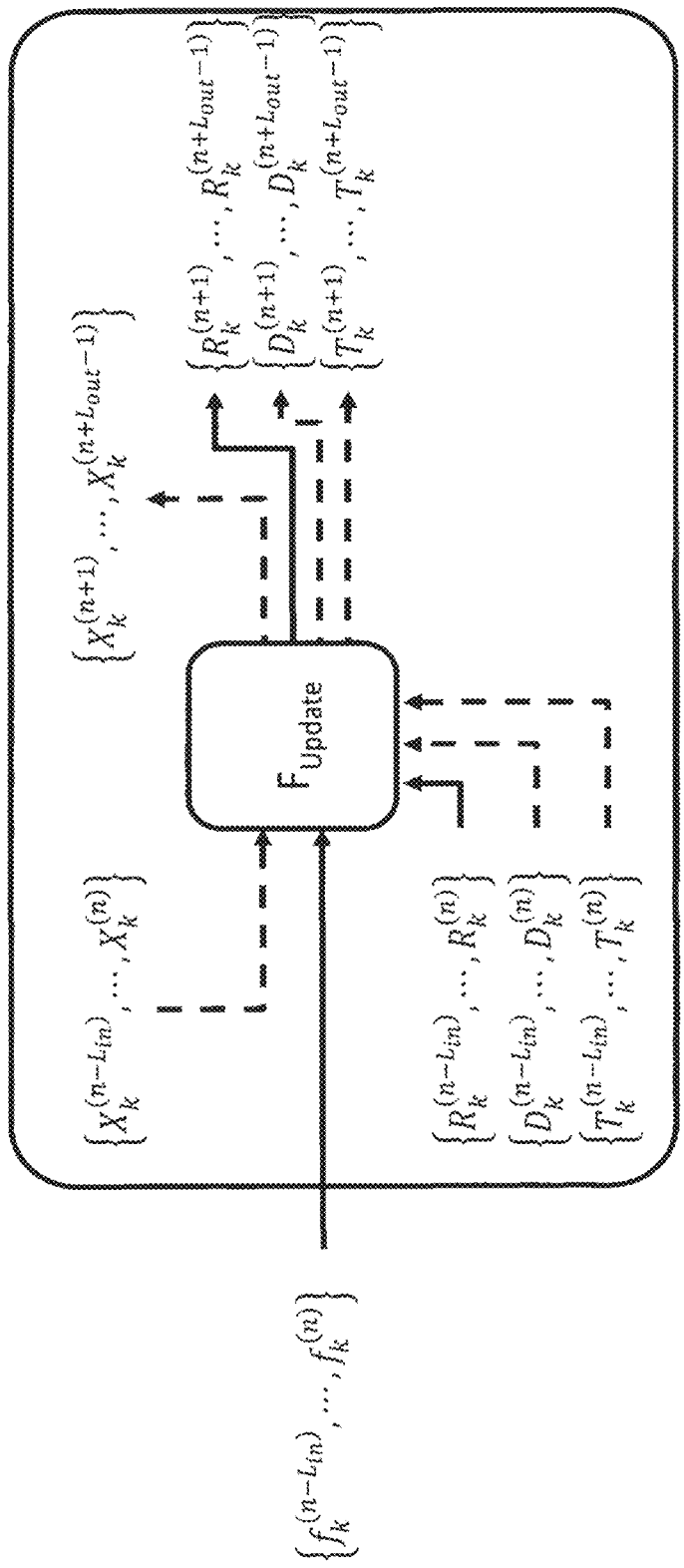
FIG. 8 illustrates the process of updating application parameters according to another specific embodiment.

In a variant depicted on FIG. 8, a $L_{in}$-memory is used. Thus, the application $APP_k$ receives several instantaneous probabilities of failure $f_k^{(t)}$ provided for time instants $t \in \{(n-L_{in}), \ldots, (n)\}$. As an example, $L_{in}=0, 1, 2$. The application $APP_k$ uses as inputs $\{R_k^{(n-L_{in}+1)}, \ldots, R_k^{(n)}\}$ and $\{f_k^{(n-L_{in}+1)}, \ldots, f_k^{(n)}\}$ to obtain updated application parameters $\{R_k^{(n+1)}, \ldots, R_k^{(n+L_{out})}\}$. As an example, $L_{out}=0, 1, 2$.

More generally, the application $APP_k$ uses as inputs $\{f_k^{(n-L_{in}+1)}, \ldots, f_k^{(n)}\}$, $\{R_k^{(n-L_{in}+1)}, \ldots, R_k^{(n)}\}$, and optionally $\{T_k^{(n-L_{in}+1)}, \ldots, T_k^{(n)}\}$, $\{D_k^{(n-L_{in}+1)}, \ldots, D_k^{(n)}\}$, $\{X_k^{(n-L_{in}+1)}, \ldots, x_k^{(n)}\}$, to obtain updated application parameters $\{R_k^{(n+1)}, \ldots, R_k^{(n+L_{out})}\}$ and optionally updated application parameters $\{T_k^{(n+1)}, \ldots, T_k^{(n+L_{out})}\}$, $\{D_k^{(n+1)}, \ldots, D_k^{(n+L_{out})}\}$, $\{X_k^{(n+1)}, \ldots, X_k^{(n+L_{out})}\}$.

The updating function $F_{update}$ may be defined in different ways.

In a first embodiment, the application initially considers a maximum probability of failure $f_k^{MAX}$. The value $f_k^{MAX}$ is determined based on the performance's needs of the application. If the received value $f_k^{(n)} > f_k^{MAX}$ then the application allows for a greater resilience such that $R_k^{(n+1)} > R_k^{(n)}$. This way, the stream $S_k$ obtains more transmission opportunities. In an example, If the received value $f_k^{(n)}$ is greater than the maximum probability of failure $f_k^{MAX}$, the resilience is increased by $\Delta R$ time slots, i.e. $R_k^{(n+1)} = R_k^{(n)} + \Delta R$, e.g. $\Delta R=1$. In this embodiment, only the resilience parameter is updated. Otherwise (i.e. if $f_k^{(n)} \leq f_k^{MAX}$), the resilience is not modified. In a variant, the resilience is decreased in the case where $f_k^{(n)}$ is significantly lower than $f_k^{MAX}$.

In a second embodiment, probabilities of failure $\{f_k^{(n+1)}, \ldots, f_k^{(n+L_{out}-1)}\}$ are estimated from $\{f_k^{(n-L_{in})}, \ldots, f_k^{(n)}\}$ as follows:

$$\begin{bmatrix} f_k^{(n+1)} \\ \vdots \\ f_k^{(n+L_{out})} \end{bmatrix} = \Gamma \cdot fctt\left(\begin{bmatrix} f_k^{(n-L_{in}+1)} \\ \vdots \\ f_k^{(n)} \end{bmatrix}\right)$$

where $\Gamma$ is a matrix and $fctt(\bullet)$ is a function that combines its input values. For example, $fctt(\,)$ is a function that outputs the average, variance, median or maximum of its input values. In a variant, $fctt(\,)$ is the identity function.

In a specific example, $$\begin{bmatrix} f_k^{(n+1)} \\ \vdots \\ f_k^{(n+L_{out})} \end{bmatrix} = \frac{1}{L_{in}} \begin{bmatrix} P_{e_k}^{-L_{in}} & \cdots & P_{e_k}^{-2} & P_{e_k}^{-1} \\ P_{e_k}^{-L_{in}-1} & \cdots & P_{e_k}^{-3} & P_{e_k}^{-2} \\ \vdots & & \vdots & \vdots \\ P_{e_k}^{-L_{in}-L_{out}+1} & \cdots & P_{e_k}^{-L_{out}-1} & P_{e_k}^{-L_{out}} \end{bmatrix} \begin{bmatrix} f_k^{(n-L_{in}+1)} \\ \vdots \\ f_k^{(n)} \end{bmatrix}$$

Given some precomputed relationships between the probability of failure and the application's requirements, the application $APP_k$ may updates its application parameters $\{R_k^{(n+1)}, \ldots, R_k^{(n+L_{out})}\}$, $\{D_k^{(n+1)}, \ldots, D_k^{(n+L_{out})}\}$, $\{T_k^{(n+1)}, \ldots, T_k^{(n+L_{out})}\}$ and $\{X_k^{(n+1)}, \ldots, X_k^{(n+L_{out})}\}$ or at least one of them, e.g. the resilience, to ensure that the estimated probabilities of failure $\{f_k^{(n+1)}, \ldots, f_k^{(n+L_{out})}\}$ are lower than the previous ones, i.e. than $\{f_k^{(n-L_{in}+1)} \ldots f_k^{(n)}\}$. Supposing $P_{e_k}^{(n)}$ is constant over time, the application $APP_k$ can estimate $P_{e_k}$ from the formula $\log f_k^{(n)} = Q_k^{(n)} \log P_{e_k}$. Since $Q_k^{(n)}$ directly depends on the application's parameters, $APP_k$ can choose new application parameters therefrom to change the value of the $f_k^{(n+j)}$, $j \geq 1$.

In a third embodiment, the application $APP_k$ is a control application for a motor of a wheel of a robot. The variable $X_k^{(n)}$ represents an angular speed provided by the motor to the wheel at time instant n. The application messages are monitoring information periodically required with the period $T_k^{(n)}$ which is directly computed from the angular speed, e.g. $T_k^{(n)}$. Given a maximum probability of failure $f_k^{MAX}$, if $f_k^{(n)} > f_k^{MAX}$, then the application reduces the angular velocity such that $X_k^{(n+1)} < x_k^{(n)}$. In an example, $X_k^{(n+1)}$ decreased by $\Delta X$, i.e. $X_k^{(+1)} = X_k^{(n)} - \Delta X$, e.g. $\Delta X = 1$ m/s or 2 m/s. The value $\Delta X$ is determined based on the performance's needs of the application. Consequently, the period of the application messages increases such that $T_k^{(+1)} > T_k^{(n)}$. If the application requires the same number of transmission opportunities within a resilience window, then the resilience is increased such that $R_k^{(n+1)} > R_k^{(n)}$. For example, the resilience is increased by $\Delta R$ time slots, i.e. $R_k^{(n+1)} = R_k^{(n)} + \Delta R$, e.g. $\Delta R = 1$.

In this embodiment, $D_k^{(n)}$ is not updated.

In a fourth embodiment, one of the controlling devices 12A-12B acts as a global application that manages all the single applications $APP_k$. In the case where too many probabilities of failure $f_k^{(n)}$ are above their threshold $f_k^{MAX}$ then the controlling device that acts as a global application asks for a re-planification of the missions. Some streams, thus some applications $APP_k$, may be stopped for a while and some others may have their application parameters redefined.

In a fifth embodiment, the application $APP_k$ knows some mathematical relationships between $f_k^{(n)}$ and one or more of the parameters $R_k^{(n)}$ $T_k^{(n)}$ $D_k^{(n)}$ $X_k^{(n)}$. Said otherwise, the application $APP_k$ knows the following function $G(\,)$: $f_k^{(n)} = G(R_k^{(n)}, T_k^{(n)}, D_k^{(n)}, X_k^{(n)})$. In another embodiment, only one application parameter or a subset of them is considered as an input of the function $G(\,)$ e.g. $f_k^{(n)} = G(R_k^{(n)} T_k^{(n)})$. In this case, the other application parameters are not updated.

The application $APP_k$ thus computes at least one new application parameter among $R_k^{(n+1)}$, $T_k^{(n+1)}$, $D_k^{(n+1)}$ and optionally $X_k^{(n+1)}$ from $f_k^{(n+1)}$ by inverting $G(\,)$, $f_k^{(n+1)}$ is determined by the application $APP_k$ so that it is lower than the received $f_k^{(n)}$ For example, $f_k^{(n+1)}$ is determined as follows: $f_k^{(n+1)} = f_k^{(n)} - \Delta f$, e.g. $\Delta f = 10\%$. The value $\Delta f$ is determined based on the performance's needs of the application.

In one specific embodiment, the application $APP_k$ learns the function $G(\,)$ offline. In a variant, the application scans all the possible values of all the application parameters and selects the set of values that either minimizes $f_k^{(n)}$ or leads $f_k^{(n)}$ close to an arbitrary target value of $f_k^{(n)}$.

In a sixth embodiment, the application $APP_k$ transmits to the resource scheduler the target failure probability $f_k^{MAX}$. In this embodiment, the resource scheduler, instead of the application $APP_k$, updates at least one application parameter to ensure a probability of failure $f_k^{(n+1)}$ lower than or equal to $f_k^{MAX}$.

From $f_k^{MAX}$, the resource scheduler thus determines values $R_k^{(n+1)}$, $T_k^{(n+1)}$, $D_k^{(n+1)}$ or at least one of them so that $f_k^{(n+1)} \leq f_k^{MAX}$. The determined value(s) is(are) transmitted to the corresponding application $APP_k$.

In a variant, the resource scheduler only determines a single value of $R_k^{(n+1)}$ and transmits it to the corresponding application $APP_k$. In this variant, the values $T_k^{(n+1)}$ and $D_k^{(n+1)}$ are not updated. Thus, they are set equal to the values previously given by the application, i.e. $T_k^{(n)}$ $D_k^{(n)}$.

In another variant, the resource scheduler determines pairs of values of $R_k^{(n+1)}$ $T_k^{(n+1)}$ while $D_k^{(n+1)}$ is not updated, i.e. $D_k^{(n)}$. Since the number of possible pairs might be very high, the resource scheduler may select a finite number of them, for example by taking the values of $R_k^{(n+1)}$ in a limited search space, such as a linear quantization between a maximum and minimum value.

In another variant, the application $APP_k$ informs the resource scheduler of the requested feedbacks, for example, a set of values $T_k^{(n)}$, $D_k^{(n)}$ satisfying $f_k^{(n)} = f_k^{MAX}$ for a fixed value of $R_k^{(n)}$ or any combination of this type. In this case, the application $APP_k$ transmits to the resource scheduler $f_k^{MAX}$ and $R_k^{(n)}$. For its part, the resource scheduler determines a set of values $T_k^{(n+1)}$ $D_k^{(n+1)}$, $D_k^{(n+1)}$ satisfying $f_k^{(n)} = f_k^{MAX}$ and fulfilling the resilience constraint, i.e. $R_k^{(n+1)} = R_k^{(n)}$.

Figure 9:
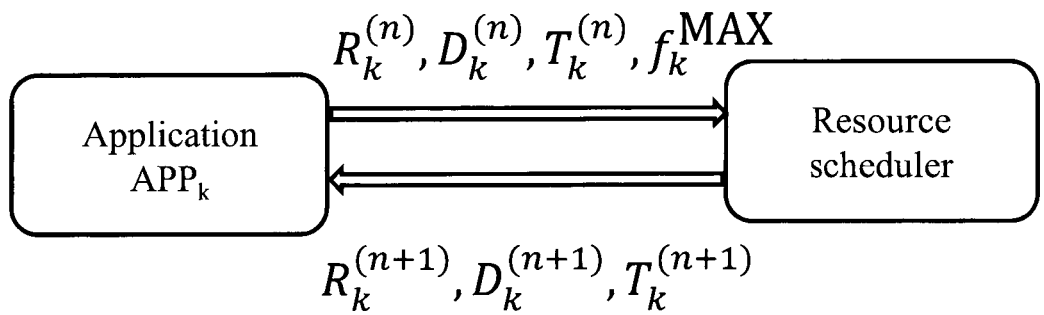
FIG. 9 illustrates the process of updating application parameters according to a specific embodiment.

As depicted on FIG. 9, the application parameters updated by the resource scheduler may be either transmitted to the application $APP_k$ as proposals or directly implemented within the application hardware.

Figure 10:
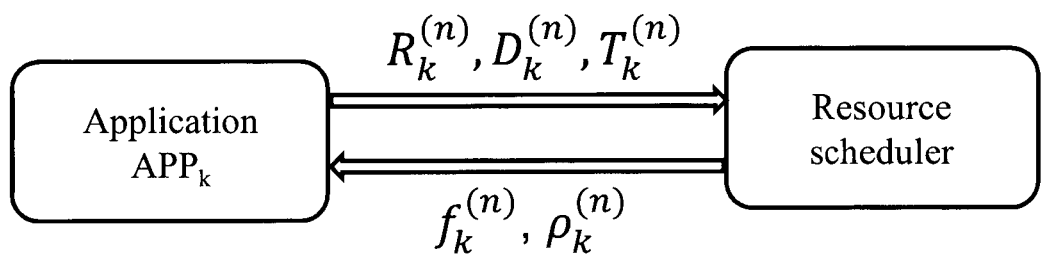
FIG. 10 illustrates the process of updating application parameters according to a specific embodiment.

In a seventh embodiment illustrated by FIG. 10, $\rho_k^{(n)}$ is used to compute $f_k^{(n)}$.

$\rho_k^{(n)}$ and $f_k^{(n)}$ are thus transmitted to the application $APP_k$ which updates at least one of its application parameters in the same manner as mentioned in the first to sixth embodiments, using $\rho_k^{(n)}$ as an additional parameter used to update the application parameter. As an example related to the fourth embodiment, G( ) is defined as $(R_k^{(n)}, T_k^{(n)}, D_k^{(n)}, X_k^{(n)}) = G^{-1}(\rho_k^{(n)}, f_k^{(n)})$.

Figure 11:
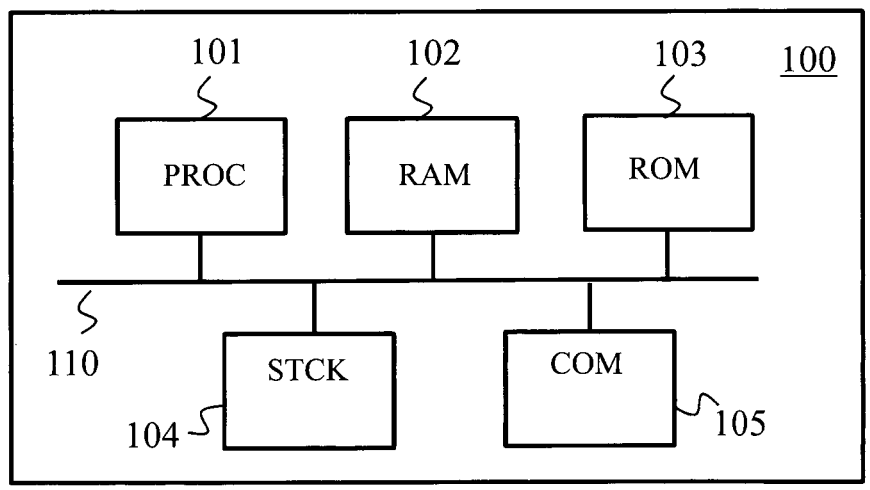
FIG. 11 illustrates schematically an example of hardware architecture of a resource scheduler according to a specific embodiment.

FIG. 11 illustrates schematically an example of hardware architecture of a resource scheduler according to a specific embodiment.

The resource scheduler 100 comprises, connected by a communication bus 110: a processor or CPU (acronym of "Central Processing Unit") 101; a random access memory RAM 102; a read only memory ROM 103; a storage unit 104 such as an hard disk or such as a storage medium reader, e.g. a SD (acronym of "Secure Digital") card reader; and at least one set of communication interfaces COM 105 enabling the resource scheduler 100 to transmit and receive data.

The processor 101 is capable of executing instructions loaded into the RAM 102 from the ROM 103, from an external memory (such as an SD card), from a storage medium (such as the HDD), or from a communication network. When the resource scheduler 100 is powered up, the processor 101 is capable of reading instructions from the RAM 102 and executing them. These instructions form a computer program causing the implementation, by the processor 101, of the method described in relation to FIG. 4.

The method described in relation to FIG. 4 may be implemented in software form by the execution of the set of instructions by a programmable machine, for example a DSP (acronym of "Digital Signal Processor"), a microcontroller or a GPU (acronym of "Graphics Processing Unit"), or be implemented in hardware form by a machine or a dedicated component (chip or chipset), for example an FPGA (acronym of "Field-Programmable Gate Array") or an ASIC (acronym of "Application-Specific Integrated Circuit"). In general, the resource scheduler 100 includes electronic circuitry adapted and configured for implementing the method described in relation to FIG. 4.

Figure 12:
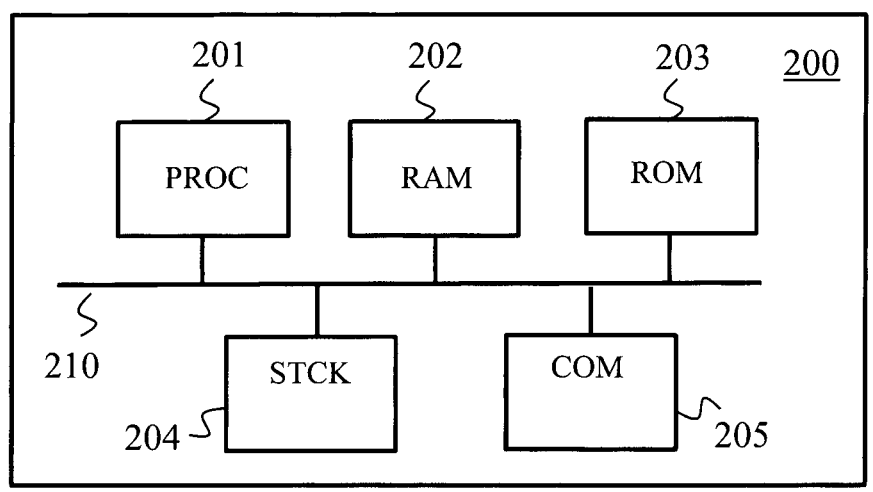
FIG. 12 illustrates schematically an example of hardware architecture of a device hosting an application according to a specific embodiment.

FIG. 12 illustrates schematically an example of hardware architecture of a device 200 hosting an application $APP_k$ according to a specific embodiment. The device 200 may be a robot or a controlling device.

The device 200 comprises, connected by a communication bus 210: a processor or CPU (acronym of "Central Processing Unit") 201; a random access memory RAM 202; a read only memory ROM 203; a storage unit 204 such as an hard disk or such as a storage medium reader, e.g. a SD (acronym of "Secure Digital") card reader; and at least one set of communication interfaces COM 205 enabling the device 200 to transmit and receive data.

The processor 201 is capable of executing instructions loaded into the RAM 202 from the ROM 203, from an external memory (such as an SD card), from a storage medium (such as the HDD), or from a communication network. When the device 200 is powered up, the processor 201 is capable of reading instructions from the RAM 202 and executing them. These instructions form a computer program causing the implementation, by the processor 201, of the method described in relation to FIGS. 6-10.

The method described in relation to FIGS. 6-10 may be implemented in software form by the execution of the set of instructions by a programmable machine, for example a DSP (acronym of "Digital Signal Processor"), a microcontroller or a GPU (acronym of "Graphics Processing Unit"), or be implemented in hardware form by a machine or a dedicated component (chip or chipset), for example an FPGA (acronym of "Field-Programmable Gate Array") or an ASIC (acronym of "Application-Specific Integrated Circuit"). In general, the device 200 includes electronic circuitry adapted and configured for implementing the method described in relation to FIGS. 6-10.

The invention claimed is:

1. A method for allocating a radio resource in a system comprising a resource scheduler and a set of devices, each device hosting at least one application, each application transmitting messages to at least one receiver on a transmission channel, the method, executed by the resource scheduler, comprising at least one iteration n of:
   a) receiving, from each application, application parameters representative of requirements for the application at iteration n;
   b) computing, for each application, a metric from an instantaneous probability of failure of said application, from an average probability of failure of said application computed at iteration (n−1) and further from a channel error probability of said transmission channel, wherein the average probability of failure of the application and the instantaneous probability of failure of the application are computed from at least one of the received application parameters and from the channel error probabilities of the transmission channel;
   c) comparing the metrics and, responsive to said comparison, selecting the application to allocate the radio resource to;
   d) updating, for each application, the average probability of failure at iteration n from the average probability of failure of the application computed at iteration (n−1); and
   e) transmitting the instantaneous probability of failure computed at iteration n to each application, said instantaneous probability of failure at iteration n being used by said application to update at least one of its application parameters, the updated at least one application parameters being used by the resource scheduler at an iteration (n+1) to allocate a new radio resource.

2. The method according to claim 1, wherein said application parameters representative of requirements for the application of index k at iteration n comprise a resilience value $R_k^{(n)}$ being a maximum amount of time authorized by the application of index k for not receiving any message, a message lifetime $D_k^{(n)}$ and a message period $T_k^{(n)}$.

3. The method according to claim 1, wherein computing, for each application, a metric from an instantaneous probability of failure of the application, an average probability of failure of the application and further from a channel error probability of the transmission channel, wherein the instantaneous probability of failure of the application is computed from at least part of the received application parameters an from the channel error probability of said transmission channel comprises:

computing said metric $M_k^{(n)}$ as follows:

$$M_k^{(n)} = \frac{\left(1 - P_{e_k}^{(n)}\right) f_k^{(n)}}{\left(N_k^{(n-1)} + 1\right) F_k^{(n-1)\alpha}}$$

where $N_k^{(n-1)}$ is a number of messages buffered by said application of index k since the application started;
$f_k^{(n)}$ is the instantaneous probability of failure of the application of index k at iteration n;
$F_k^{(n-1)}$ is the average probability of failure of said application of index k at iteration (n−1); and
α is a parameter determined for ensuring fairness resource allocation between streams.

4. The method according to claim 3, wherein $$f_k^{(n)} = P_{e_k}^{(n)\rho_k^{(n)} H\left(Q_k^{(n)}\right)},$$

where $Q_k^{(n)}$ is a number of transmission opportunities before a resilience violation of the application of index k or a number of time slots before a resilience violation of the application of index k, H( ) is a predefined increasing affine function or an identity function and $\rho_k^{(n)}$ is an average resource usage.

5. The method according to claim 1, wherein updating the average probability of failure $F_k^{(n)}$ comprises:
computing $$F_{k^*}^{(n)} = \frac{N_{k^*}^{(n-1)} F_{k^*}^{(n-1)}}{N_{k^*}^{(n-1)} + 1}$$

and $N_{k^*}^{(n)} = N_{k^*}^{(n-1)} + 1$, in the case where k* is the index of the selected application and a packet corresponding to a message sent by the selected application using the allocated radio resource is received;
otherwise if there is still a transmission opportunity, computing $F_k^{(n)} = F_k^{(n-1)}$ and $N_k^{(n)} = N_k^{(n-1)}$ and if there is no more transmission opportunity, computing $$F_k^{(n)} = \frac{N_k^{(n-1)} F_k^{(n-1)} + 1}{N_k^{(n-1)} + 1}$$

and $N_k^{(n)} = N_k^{(n-1)} + 1$.

6. A computer program product comprising program code instructions that can be loaded in a programmable device, the program code instructions causing implementation of the method according to claim 1 when the program code instructions are run by the programmable device.

7. A storage medium storing a computer program comprising program code instructions, the program code instructions causing implementation of the method according to claim 1 when the program code instructions are read from the storage medium and run by the programmable device.

8. A method for allocating a radio resource in a system comprising a resource scheduler and a set of devices, each device hosting at least one application, each application transmitting messages to at least one receiver on a transmission channel, the method comprising the following steps executed by each device hosting at least one application:

receiving, for said at least one application, an instantaneous probability of failure of said application computed by said resource scheduler from at least one application parameter received at an iteration on by the resource scheduler from the application and from a channel error probability of the transmission channel;
updating the at least one application parameter representative of application's requirements responsive to said received instantaneous probability of failure and further to a previous value of said application parameter;
transmitting the updated application parameter to said resource scheduler, said updated application parameters being used by said resource scheduler to allocate a new radio resource at an iteration (n+1).

9. The method according to claim 8, wherein, said at least one application parameter being a resilience value, updating at least one application parameter comprises comparing the received instantaneous probability of failure with a threshold value and increasing said resilience value in the case where the received instantaneous probability of failure is above said threshold value.

10. The method according to claim 8, wherein updating at least one application parameter comprises updating a resilience value and an angular velocity by comparing the received instantaneous probability of failure with a threshold value and decreasing said angular velocity and further increasing said resilience value in the case where the received instantaneous probability of failure is above said threshold value.

11. The method according to claim 8, wherein the method further comprises:
receiving, for said at least one application, an average resource usage of said application from said resource scheduler;
and wherein said at least one application parameter is updated responsive to said received instantaneous probability of failure, to a previous value of said application parameter and further to said average resource usage.

12. A computer program product comprising program code instructions that can be loaded in a programmable device, the program code instructions causing implementation of the method according to claim 8 when the program code instructions are run by the programmable device.

13. A storage medium storing a computer program comprising program code instructions, the program code instructions causing implementation of the method according to claim 8 when the program code instructions are read from the storage medium and run by the programmable device.

14. A resource scheduler configured for allocating a radio resource in a system comprising a set of devices, each device hosting at least one application, each application transmitting messages to at least one receiver on a transmission channel, the resource scheduler comprising at least one processor configured to:
a) receive, from each application, application parameters representative of requirements for the application at iteration n;
b) compute, for each application, a metric from an instantaneous probability of failure of the application, from an average probability of failure of the application computed at iteration (n−1) and further from a channel error probability of the transmission channel, wherein the instantaneous probability of failure of the application is computed from at least one of the received application parameters and from the channel error probability of the transmission channel;

c) compare the metrics and, responsive to said comparison, selecting the application to allocate the radio resource to;
d) update, for each application, the average probability of failure at iteration n from the average probability of failure of the application computed at iteration (n−1); and
e) transmit the instantaneous probability of failure computed at iteration n to each application, said instantaneous probability of failure at iteration n being used by said application to update the application parameters, the updated at least one application parameters being used by the resource scheduler at iteration (n+1) to allocate a new radio resource.

15. A device hosting an application in a system comprising a resource scheduler configured to allocate a radio resource and a set of devices, each device hosting at least one application, each application transmitting messages to at least one receiver on a transmission channel, the device comprising at least one processor configured to:

receive, for said at least one application, an instantaneous probability of failure of said application computed by the resource scheduler from at least one application parameter received at an iteration n by the resource scheduler from the application and from a channel error probability of the transmission channel;

update the at least one application parameter representative of application's requirements responsive to said received instantaneous probability of failure, and further to a previous value of said application parameter;

transmit the updated application parameter to said resource scheduler, said updated application parameters being used by said resource scheduler to allocate a new radio resource at an iteration (n+1).

16. A system comprising a resource scheduler according to claim 11 and a device hosting an application according to claim 15.

* * * * *